(12) United States Patent
Dion et al.

(10) Patent No.: US 7,196,160 B2
(45) Date of Patent: Mar. 27, 2007

(54) CATALYSTS AND METHODS FOR POLYMERIZING MACROCYCLIC OLIGOMERS

(75) Inventors: Robert P. Dion, Midland, MI (US); Brian A. Jazdzewski, Charleston, WV (US); Francis J. Timmers, Midland, MI (US); Keith J. Watson, Midland, MI (US); Paul C. Vosejpka, Homer Township, MI (US)

(73) Assignee: Dow Global Technologies Inc, Midland, MI (US)

( * ) Notice: Subject to any disclaimer, the term of this patent is extended or adjusted under 35 U.S.C. 154(b) by 0 days.

(21) Appl. No.: 11/110,051

(22) Filed: Apr. 20, 2005

(65) Prior Publication Data

US 2006/0025562 A1    Feb. 2, 2006

Related U.S. Application Data

(60) Provisional application No. 60/564,552, filed on Apr. 22, 2004.

(51) Int. Cl.
*C08G 63/87* (2006.01)
*C08G 63/00* (2006.01)

(52) U.S. Cl. .............. 528/283; 528/272; 524/783; 524/784; 524/786

(58) Field of Classification Search .......... 524/783, 524/784, 786; 528/283, 272
See application file for complete search history.

(56) References Cited

U.S. PATENT DOCUMENTS

| | | | |
|---|---|---|---|
| 5,039,786 A | 8/1991 | Pipper et al. | |
| 5,407,984 A | 4/1995 | Brunelle et al. | |
| 6,187,711 B1 | 2/2001 | Bernard et al. | |
| 6,350,850 B1 | 2/2002 | Ueda et al. | |
| 6,369,157 B1 | 4/2002 | Winckler et al. | |
| 6,420,047 B2 | 7/2002 | Winckler et al. | |
| 6,420,048 B1 | 7/2002 | Wang | |
| 6,436,549 B1* | 8/2002 | Wang | 428/480 |
| 6,525,164 B2 | 2/2003 | Faler | |
| 6,649,557 B1 | 11/2003 | Bernard et al. | |
| 6,960,626 B2* | 11/2005 | Takekoshi et al. | 524/789 |
| 2001/0049430 A1 | 12/2001 | Winckler et al. | |
| 2004/0011992 A1 | 1/2004 | Winckler et al. | |
| 2005/0059768 A1* | 3/2005 | Dion et al. | 524/445 |

FOREIGN PATENT DOCUMENTS

| | | |
|---|---|---|
| EP | 709420 | 5/1996 |
| EP | 1069145 | 1/2001 |
| WO | WO 02/18476 | 3/2002 |
| WO | WO 03/013059 | 4/2003 |
| WO | WO 03/080705 | 10/2003 |

OTHER PUBLICATIONS

Nagahata etal., "Solid-Phase Thermal Polymerization of Macrocyclic Ethylene Terephthalate Dimer ...", J. Polym. Sci: Part A: Polymer Chemistry, vol. 38, 3360-3368 (2000).
Kricheldorf et al., "Polylactones.LXI. Polymerization of . . . " J. Macromolecular Science vol. 40 (10) pp. 1009-1018 (2003).

* cited by examiner

*Primary Examiner*—Duc Truong
(74) *Attorney, Agent, or Firm*—Gary C Cohn, PLLC

(57) ABSTRACT

Cyclic oligomers containing ester linkages are polymerized in the presence of a catalyst having at least one oxygen atom bonded to two metal atoms. At least one of the metal atoms is a tin atom, which is preferably tetravalent, i.e., bonded to three other groups in addition to the oxygen atom. The other metal atom may also be another tin atom, which is again preferably tetravalent, or a zinc, aluminum or titanium atom. The catalyst may contain multiple oxygen atoms that are bonded to two such metal atoms as described. These catalysts are active, efficient polymerization catalysts. They are often liquids at polymerization temperatures. The catalysts can be formed in situ in the polymerization process, which provides additional flexibility in the process and increased storage stability of starting materials.

6 Claims, No Drawings

CATALYSTS AND METHODS FOR POLYMERIZING MACROCYCLIC OLIGOMERS

CROSS-REFERENCE TO RELATED APPLICATION

This application claims benefit of U.S. Provisional Application No. 60/564,552, filed Apr. 22, 2004.

BACKGROUND OF THE INVENTION

This invention relates to methods for forming polyesters and polyester copolymers from cyclic oligomeric esters.

The ring-opening polymerization of cyclic oligomers containing ester linkages is a convenient way of preparing high molecular weight polyesters. Although polyesters are thermoplastics, and can be melt processed even as high molecular weight polymers, the polymerization of the cyclic oligomers offers the possibility of conducting molding or other melt processing operations simultaneously with the polymerization. The oligomers melt to form relatively low viscosity fluids that can be easily pumped and/or used to impregnate a variety of reinforcing materials. Therefore, using cyclic oligomers provides a means by which a high molecular weight polymer can be processed much like many thermosetting polymer systems.

The ring-opening polymerization is conducted in the presence of a catalyst in order to obtain commercially reasonable cycle times. A variety of basic amine, weak carboxylic acid salts, sulfonic acids, phosphonium tetraphenyl borates, tin compounds, titanium compounds and other metal compounds have been used. 1,3-dichloro-1,1,3,3-tetrabutyldistannoxane has been reported as a catalyst for the solid-state polymerization of a macrocyclic PET dimer, producing a polymer with a somewhat low weight average molecular weight in the range of ~22,000–36,000. See, e.g., Nagahata et al., "Solid-State Thermal Polymerization of Macrocyclic Ethylene Terephthalate Dimer Using Various Transesterification Catalysts", *J. Polym. Sci. Part A: Polym. Chem*, Vol. 38, 3360–3368 (2000).

The catalyst desirably fulfills several needs. First, it must be an active and efficient catalyst. Second, the catalyst is preferably a liquid under polymerization conditions, so it can be handled and metered easily. Third, the catalyst and its residues desirably have little or no activity in promoting reactions that significantly degrade the molecular weight of the polymer during thermal processing operations.

SUMMARY OF THE INVENTION

In one aspect, this invention is a process for polymerizing a macrocyclic oligomer, comprising heating the macrocyclic oligomer to a temperature sufficient to melt the macrocyclic oligomer, in the presence of a polymerization catalyst for the macrocyclic oligomer, wherein the polymerization catalyst has at least one oxygen atom that is bonded to a tetravalent tin atom and a zinc atom, titanium atom, aluminum atom or another tin atom.

The polymerization catalysts used in this invention offer several advantages. They are active polymerization catalysts that facilitate polymerization to a high molecular weight polymer. The catalysts tend to be ineffective at degrading the molecular weight of the polymer during further thermal processing operations. The catalysts are often liquids at the polymerization temperatures, which makes handling and metering easier. Finally, the catalysts are capable of being formed in situ, by separately adding in two or more precursor materials that react to form the active catalyst. The precursor materials are poor or inactive esterification or ester interchange catalysts, and hence each can be blended with the oligomers to form a storage stable mixture containing molten oligomer and one of the precursors.

DETAILED DESCRIPTION OF THE INVENTION

The polymerization catalyst has at least one oxygen atom bonded directly to two metal atoms. At least one of the metal atoms is a tin atom, which is preferably tetravalent, i.e., bonded to three other groups in addition to the oxygen atom. The other metal atom may also be another tin atom, which is again preferably tetravalent, or a zinc, aluminum or titanium atom. The catalyst may contain multiple oxygen atoms that are bonded to two such metal atoms as described.

Suitable polymerization catalysts can be represented as

$$R_nQ_{(3-n)}Sn-O-X \qquad (I)$$

where n is 1 or 2, each R is independently an inertly substituted hydrocarbyl group, Q is an anionic ligand, and X is a moiety having a tin, zinc, aluminum or titanium atom bonded directed to the adjacent oxygen atom. Suitable X groups include —$SnR_nQ_{(3-n)}$, where R, Q and n are as described before; —ZnQ, where Q is as described before, —$Ti(Q)_3$, where Q is as described before, and —$AlR_p(Q)_{(2-p)}$, where R is as described before and p is zero, 1 or 2. Preferred Q groups include —OR groups, where R is as described above. When X is $SnR_nQ_{(3-n)}$, R and/or OR groups may be divalent radicals that form ring structures including one or more of the tin or other metal atoms in the catalyst.

Preferred X moieties are —$SnR_nQ_{(3-n)}$, —$Ti(OR)_3$ and —$AlR_p(OR)_{(2-p)}$. —$SnR_nQ_{(3-n)}$ is a particularly preferred type of X moiety.

In the foregoing structures, n is preferably 2.

R is suitably alkyl, cycloalkyl, aromatic-substituted alkyl, aryl or aralkyl. The R group preferably has from 1 to 12, especially from 2 to 8 carbon atoms. Examples of suitable R groups include methyl, ethyl, n-butyl, t-butyl, hexyl (all isomers), octyl (all isomers), cyclohexyl, benzyl, phenyl, napthyl and the like. n-Butyl and t-butyl are especially preferred R groups. The R group may have substituents such as halo-, hydroxyl, and ether groups, provided that such groups do not undesirably affect the activity of the catalyst.

Q is suitably a monovalent anion. Examples of suitable Q groups include hydroxyl, halide (including fluoride, chloride, bromide, iodide, but especially chloride), hydrocarbyl oxide such as alkoxide and aryloxide, carboxylate, and like groups. Suitable alkoxides have from about 1 to about 16, especially from about 1 to about 8 carbon atoms. The alkoxide group may be substituted with substituent groups such as halogen, hydroxyl, ether, aromatic or other groups, provided that the catalyst remains active. Methoxide and ethoxide groups are particularly suitable. Suitable carboxylates include conjugate bases of carboxylic acids having from about 2 to about 22, preferably from about 2 to about 18 carbon atoms. Examples of these include acetate, propionate, butyrate, benzoate, acrylate, oleate, laurate and methacrylate.

Examples of particular polymerization catalysts include 1,3-dichloro-1,1,3,3-tetrabutyldistannoxane; 1,3-dibromo-1,1,3,3-tetrabutyldistannoxane; 1,3-difluoro-1,1,3,3-tetrabutyldistannoxane, 1,3-diacetyl-1,1,3,3-tetrabutyldistannoxane; 1-chloro-3-methoxy-1,1,3,3-tetrabutyldistannoxane; 1,3-dimethoxy-1,1,3,3-tetrabutyl distannoxane; 1,3-diethoxy-1,1,3,3-tetrabutyldistannoxane; 1,3-(1,2-glycolate)-1,1,3,3-tetrabutyldistannoxane; 1,3-dichloro-1,1,3,3-tetraphenyldistannoxane; (n-butyl)$_2$(ethoxy)Sn—O—Al(ethoxide)$_2$, (n-butyl)$_2$(methoxy)Sn—O—Zn(methoxide), (n-butyl)$_2$(i-propoxy)Sn—O—Ti(i-propoxide)$_3$, (n-butyl)$_3$Sn—O—Al(ethyl)$_2$, (t-butyl)$_2$(ethoxy)Sn—O—Al(ethoxide)$_2$, and the like.

Suitable distannoxane catalysts (i.e., where X is —SnR$_n$Q$_{(3-n)}$) are described in U.S. Pat. No. 6,350,850, incorporated herein by reference.

Useful distannoxane catalysts are conveniently prepared by reacting a tin oxide of the general structure R$_2$Sn=O with a tin compound of the structure R$_n$Q$_{(4-n)}$Sn, where R, Q and n are as described before. The respective reactions are believed to proceed as follows:

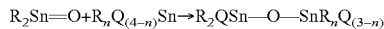

Analogous synthesis reactions can be used to prepare catalysts in which X is —ZnQ, —Ti(Q)$_3$, —AlR$_p$(Q)$_{(2-p)}$. Examples of such reactions include:

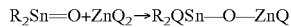

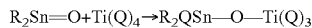

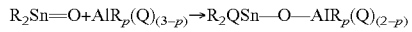

In each of the foregoing reactions, the catalyst is formed in the reaction of two precursor materials. These reactions generally occur at temperatures at or below the melting temperature of the cyclic oligomers, and under the conditions of the cyclic oligomer polymerization process, without the need for special conditions, additional catalysts and the like. Therefore, the catalysts can be formed in situ during the cyclic oligomer polymerization process, as described more fully below.

Alternatively, an exchange reaction may be employed to arrive at the desired catalyst as shown below.

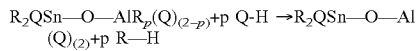

The catalyst is advantageously a liquid or a solid having a melting temperature of less than about 200° C., such as less than 180° C., especially less than 160° C. If desired, or if the catalyst has a melting temperature higher than this range, it may be slurried or dissolved in a diluent or solvent, in order to facilitate handling and/or metering. If the catalyst is formed in situ, the precursors advantageously have the same characteristics.

The cyclic oligomer is a polymerizable cyclic material having two or more ester linkages in a ring structure. The ring structure containing the ester linkages includes at least 8 atoms that are bonded together to form the ring. The oligomer includes two or more structural repeat units that are connected through the ester linkages. The structural repeat units may be the same or different. The number of repeat units in the oligomer suitably ranges from about 2 to about 8. Commonly, the cyclic oligomer will include a mixture of materials having varying numbers of repeat units. A preferred class of cyclic oligomers is represented by the structure

where A is a divalent alkyl, divalent cycloalkyl or divalent mono- or polyoxyalkylene group, B is a divalent aromatic or divalent alicyclic group, and y is a number from 2 to 8. The bonds indicated at the ends of structure II connect to form a ring. Examples of suitable macrocyclic oligomers corresponding to structure II include oligomers of 1,4-butylene terephthalate (PBT), 1,3-propylene terephthalate (PPT), 1,4-cyclohexenedimethylene terephthalate (PCT), ethylene terephthalate (PET), and 1,2-ethylene-2,6-naphthalenedicarboxylate (PEN), and copolyester oligomers comprising two or more of these. Preferred macrocyclic oligomers include oligomers of PBT, PPT, PCT, PEN or copolyester oligomers of two or more of these or one or more of these and PET. The macrocyclic oligomer is preferably one having a melting temperature of below about 200° C. and preferably in the range of about 130–190° C. A particularly preferred cyclic oligomer is a PBT oligomer.

Suitable methods of preparing the cyclic oligomer are described in U.S. Pat. Nos. 5,039,783, 6,369,157 and 6,525,164, WO 02/18476 and WO03/031059, all incorporated herein by reference. In general, cyclic oligomers are suitably prepared by reacting a diol with a diacid, diacid chloride or diester, or by depolymerization of a linear polyester. The method of preparing the cyclic oligomer is generally not critical to this invention.

Similarly, methods of polymerizing cyclic oligomers are well known. Examples of such methods are described in U.S. Pat. Nos. 6,369,157 and 6,420,048 WO 03/080705 and U.S. Published Application 2004/0011992, among many others. Any of these conventional polymerization methods are suitable for use with this invention, the methods being modified in that the polymerization is conducted in the presence of the polymerization catalyst described above.

The polymerization may be conducted neat (i.e., solventless) or in the presence of a solvent.

In general, the polymerization is conducted by heating the cyclic oligomer above its melting temperature in the presence of an effective amount of the catalyst. The polymerizing mixture is maintained at the elevated temperature until the desired molecular weight is obtained. Suitable polymerization temperatures are from about 100° C. to about 300° C., with a temperature range of about 100° C. to about 280° C. being preferable and a temperature range of about 180 to about 270° C. being especially preferred.

The catalyst is advantageously used in amount of about 0.0001 to about 0.05 mole of catalyst per mole. The catalyst may be used in an amount of about 0.0005 to about 0.01 mole/mole. A particularly useful amount of catalyst is from about 0.001 to about 0.006 mole/mole. Amounts may vary somewhat depending on the activity of the particular catalyst, and the desired rate of reaction.

The polymerization advantageously proceeds to a conversion of at least 90% of monomer to polymer, preferably to at least 95% conversion, to produce a polymer having a weight average molecular weight of at least 60,000, preferably at least 80,000, as measured via gel permeation chromatography against polystyrene standards.

The polymerization may be conducted in a closed mold to form a molded article. An advantage of cyclic oligomer polymerization processes is that they allow thermoplastic resin molding operations to be conducted using techniques that are generally applicable to thermosetting resins. When melted, the cyclic oligomer typically has a relatively low viscosity. This allows the cyclic oligomer to be used in reactive molding process such as liquid resin molding, reaction injection molding and resin transfer molding, as well as in processes such as resin film infusion, impregnation of fiber mats or fabrics, prepreg formation, pultrusion and filament winding that require the resin to penetrate between individual fibers of fiber bundles to form structural composites. Certain processes of these types are described in U.S. Pat. No. 6,420,047, incorporated herein by reference.

The resulting polymer must achieve a temperature below its crystallization temperature before it is demolded. Thus, it may be necessary to cool the polymer before demolding (or otherwise completing processing). In some instances, particularly in polymerizing butylene terephthalate oligomers, the melting and polymerization temperature of the oligomers is below the crystallization temperature of the resulting polymer. In such a case, the polymerization temperature is advantageously between the melting temperature of the oligomer and the crystallization temperature of the polymer. This allows the polymer to crystallize at the polymerization temperature (isothermal curing) as molecular weight increases. In such cases, it is not necessary to cool the polymer before demolding can occur.

A problem with conventional catalysts for cyclic oligomer polymerization processes is premature polymerization. Because the cyclic oligomers are solids at room temperatures, it is necessary to heat them above the melting temperature in order to use them in many molding and impregnation processes. It is convenient to maintain a vessel of molten oligomer, which is readily transferred as a liquid to the mold or impregnation line. Preheating reduces cycle times and thus improves the efficiency of the process. However, if the molten oligomer is in the presence of catalyst, polymerization can occur in the holding vessel or transfer lines. This can lead to undesirable viscosity increases or even premature set-up. As a result, in conventional processes, it is necessary either to (1) maintain oligomer/catalyst mixtures below polymerization temperatures until they processed or (2) combine the oligomer with catalyst only immediately before processing, or during the processing operation. When the second of these approaches is used, it is necessary to provide additional metering equipment that can accurately meter the relatively small volume of catalyst into a large volume of oligomer. This adds expense and variability to the process.

The catalyst of this invention can be formed in situ in the mold or otherwise during processing. This is achieved by dividing the cyclic oligomer into two portions, each of which contains one precursor compound that will react with another precursor compound, contained in the other oligomer portion, to form the catalyst under the processing conditions. Q in the foregoing formulae is preferably a halide in this embodiment of the invention. The two portions are stored separately and brought together only during the processing step, such as through an impingement mixer, mix head or other convenient mixing device. Upon mixing, the catalyst precursors react to form the active catalyst, and the polymerization reaction then occurs. This method permits each of the starting portions to be preheated above the melting temperature of the oligomer, because the precursor materials are inactive or at most inefficient polymerization catalysts.

Copolyesters can be prepared by polymerizing the cyclic oligomer and one or more copolymerizable monomers. Such copolymers can be random copolymers, which are prepared by reacting a mixture of cyclic oligomer and comonomer. The copolymers can also be block copolymers, which are conveniently prepared by sequentially introducing the cyclic oligomer and comonomer to the polymerization. Suitable copolymerizable monomers include cyclic monoesters such as lactones. The lactone conveniently contains a 4–16, especially 4–7, member ring containing one or more ester linkages. The lactone may be substituted or unsubstituted. Suitable substituent groups include halogen, alkyl, aryl, alkoxyl, cyano, ether, sulfide or tertiary amine groups. Substituent groups preferably are not reactive with an ester group so as to function as an initiator compound. Examples of such copolymerizable monomers include glycolide, dioxanone, 1,4-dioxane-2,3-dione, ε-caprolactone, tetramethyl glycolide, β-butyrolactone, lactide, γ-butyrolactone, pentadecalactone and pivalolactone. In addition, polymeric diol materials such as polyether diols and polyester diols may be incorporated into the cyclic oligomer mixture to form block copolymers.

Various kinds of optional materials may be incorporated into the polymerization process. Examples of such materials include fillers, nanofillers, reinforcing agents (such as glass, carbon or other fibers), flame retardants, colorants, antioxidants, preservatives, mold release agents, lubricants, UV stabilizers, and the like.

The following examples are provided to illustrate the invention, but are not intended to limit the scope thereof. All parts and percentages are by weight unless otherwise indicated.

EXAMPLES 1–7

The activity of various catalysts in polymerizing cyclic butylene terephthalate oligomers is evaluated by following viscosity as a function of time in an oligomer/catalyst mixture maintained under polymerization conditions. Viscosity measurements provide rough comparisons of relative times of onset of polymerization and polymerization rates. For comparison, separate polymerizations are conducted using 2,2-di-n-butyl-2-stanna-1,3-dioxacyclopentane (Comparative Sample 1) and $CH_3(CH_2)_3Sn(OH)_2Cl$ (Comparative Sample 2) as polymerization catalysts. 2,2-di-n-butyl-2-stanna-1,3-dioxacyclopentane is a known cyclic butylenes terephthalate polymerization catalyst. $CH_3(CH_2)_3Sn(OH)_2Cl$ generally provides a longer induction time and slower polymerization rate.

Polymerizations are conducted under a nitrogen atmosphere in an Advanced Rheometric Expansion System (Rheometric Scientific) dynamic mechanical spectrometer using RSI Orchestrator software. The device is equipped with custom-made aluminum cup-and-plate fixtures. The diameters of the cup and plate are 31.8 and 7.9 mm, respectively. Approximately 3 g of cyclic butylene terephthalate oligomer/catalyst mixture is charged into the cup, which is preheated to ~190° C. The plate is lowered into the cup to contact the surface of the oligomer, and the distance between the cup and plate is measured. The oligomers are permitted to melt and the temperature of the plate and cup are equilibrated to 190° C.

Low-strain amplitude is imposed on the contents of the cup via an actuator attached to the cup. The actuator forces the cup to oscillate sinusoidally in a twisting motion about the vertical axis. Some of this energy is transmitted to the plate through the sample, causing the plate to twist sinusoidally. The viscosity of the sample is estimated from the amplitude of the cup angular displacement, the amplitude of the torque on the plate, the phase lag of the plate relative to the cup, the angular frequency of the sinusoidal signals, and the sample dimensions. This method provides good estimates of viscosity increases from about 20 poise to somewhat in excess of about 10,000 poise, and allows the progress of the polymerization to be followed.

Viscosity is followed as a function of time while maintaining the temperature at 190° C.

Catalysts and amounts are set forth in Table 1.

TABLE 1

| Example or Comparative Sample No. | Catalyst | Amount (mole %, based on cyclic butylene terephthalate) |
|---|---|---|
| 1A | 1,3-dichloro-1,1,3,3-tetra-n-butyl stannoxane | 0.15 |
| 1B | 1,3-dichloro-1,1,3,3-tetra-n-butyl stannoxane | 0.30 |
| 2A | 1,3-diacetoxy-1,1,3,3-tetra-n-butyl stannoxane | 0.15 |
| 2B | 1,3-diacetoxy-1,1,3,3-tetra-n-butyl stannoxane | 0.30 |
| 3A | 1-chloro-3-methoxy-1,1,3,3-tetra-n-butyl stannoxane | 0.15 |
| 3B | 1-chloro-3-methoxy-1,1,3,3-tetra-n-butyl stannoxane | 0.30 |
| 4A | 1,3-dichloro-1,1,3,3-tetraphenylstannoxane | 0.15 |
| 4B | 1,3-dichloro-1,1,3,3-tetraphenylstannoxane | 0.30 |
| 5 | $(n\text{-Bu})_3\text{Sn}$—O—$\text{Al(Et)}_2$ | 0.15 |
| 6 | $(n\text{-Bu})_3\text{Sn}$—O—$\text{Al(i-Bu)}_2$ | 0.15 |
| 7 | Di-n-butyl tin oxide + di(n-butyl)tindichloride | 0.45/0.15 |
| A* | 2,2-di-n-butyl-2-stanna-1,3-dioxacyclopentane | 0.30 |
| B* | $\text{CH}_3(\text{CH}_2)_3\text{Sn(OH)}_2\text{Cl}$ | 0.30 |

*Not an example of the invention.

Examples 1A and 1B exhibit a viscosity vs. time profile very similar to that of Comparative Sample A, through a viscosity ($\eta^*$) of above 10,000 poise. Examples 2A, 2B, 3A and 3B all demonstrate a shorter onset of polymerization (indicated by increasing viscosity), followed by a more gradual viscosity build through 10,000 poise, compared to Comparative Sample A. Examples 4A and 4B exhibit polymerization onset times about equal to or slightly delayed from that of Comparative Sample A, followed by a somewhat slower rate of polymerization through a viscosity of 10,000 poise. All of Examples 1A, 1B, 2A, 2B, 2C, 3A, 3B, 4A and 4A show markedly shorter onsets of polymerization and faster polymerization rates than Comparative Sample B.

Example 5 exhibits a longer polymerization onset and somewhat slower polymerization rate than either Comparative Sample A or B, through a viscosity of 10,000 poise.

Example 6 exhibits a polymerization onset intermediate to those of Comparative Sample A and Comparative Sample B, followed by a somewhat slower polymerization rate through about 10,000 poise.

In Example 7, the di-n-butyl tin oxide+di(n-butyl)tindichloride are precursor materials that react in situ to form the active catalyst, 1,3-dichloro-1,1,3,3-tetra-n-butyl stannoxane. The formation of an active catalyst is evidenced by the onset of viscosity build, after a somewhat longer time than for Comparative Sample A, and subsequent polymerization to a viscosity build of over 10,000 poise.

EXAMPLE 8

A portion of cyclic butylene terephthalate oligomers is added to a bowl of a Haake mixer that has been previously heated to 230° C. The mixer is operated at 100 rpm. After allowing the oligomers to heat for 3 minutes, 0.003 mole of 1,3-diacetoxy-1,1,3,3-tetrabutyldistannoxane/mole of cyclic butylene terephthalate is added. The reaction mixture is permitted to react for 4.5 minutes at 230° C. The resulting polymer is recovered, cooled to room temperature, crushed, ground (to pass through a 4 mm screen) and dried overnight at 90° C. This polymerization is repeated using 0.006 mole/mole of the same catalyst. Molecular weight data for the resulting polymers are as follows:

| Catalyst Concentration, mol-% | $M_n$ | $M_w$ | $M_z$ | $M_{z+1}$ |
|---|---|---|---|---|
| 0.3 | 41,600 | 95,800 | 158,000 | 234,000 |
| 0.6 | 25,000 | 61,700 | 100,000 | 145,000 |

It will be appreciated that many modifications can be made to the invention as described herein without departing from the spirit of the invention, the scope of which is defined by the appended claims.

What is claimed is:

1. A process for polymerizing a cyclic 1,4-butylene terephthalate, comprising heating the cyclic 1,4-butylene terephthalate to a temperature sufficient to melt the cyclic 1,4-butylene terephthalate, in the presence of a polymerization catalyst for the cyclic 1,4-butylene terephthalate, wherein the polymerization catalyst has the structure:

$$R_nQ_{(3-n)}\text{Sn}—\text{O}—X \quad (I)$$

where n is 1 or 2, each R is independently an inertly substituted hydrocarbyl group, Q is an anionic ligand, and X is a group having a tin, zinc, aluminum or titanium atom bonded directed to the adjacent oxygen atom.

2. The process of claim 1, wherein each X is independently —$\text{SnR}_nQ_{(3-n)}$, —ZnQ, —$\text{Ti(Q)}_3$, or —$\text{AlR}_p(Q)_{(2-p)}$, where n is from 1 to 3, each R is independently an inertly substituted hydrocarbyl group, each Q is independently an anionic ligand; and p is zero, 1 or 2.

3. The process of claim 1, wherein the polymerization catalyst is formed by combining two or more catalyst precursor materials in melted cyclic 1,4-butylene terephthalate.

4. The process of claim 3, wherein the catalyst precursor materials are combined by mixing a first portion of melted cyclic 1,4-butylene terephthalate that contains one of the catalyst precursors with at least one additional portion of melted cyclic 1,4-butylene terephthalate that contains another of the catalyst precursors.

5. The process of claim 4 wherein one catalyst precursor is a tin oxide of the general structure $R_2\text{Sn}=\text{O}$ and a second catalyst precursor is a tin compound of the structure $R_nQ_{(4-n)}\text{Sn}$, where n is 1 or 2, each R is independently an inertly substituted hydrocarbyl group and Q is an anionic ligand.

6. The process of claim 5 wherein one catalyst precursor is di-n-butyl tin oxide and the second catalyst precursor is di(n-butyl)tindichloride.

* * * * *